Figure 1:
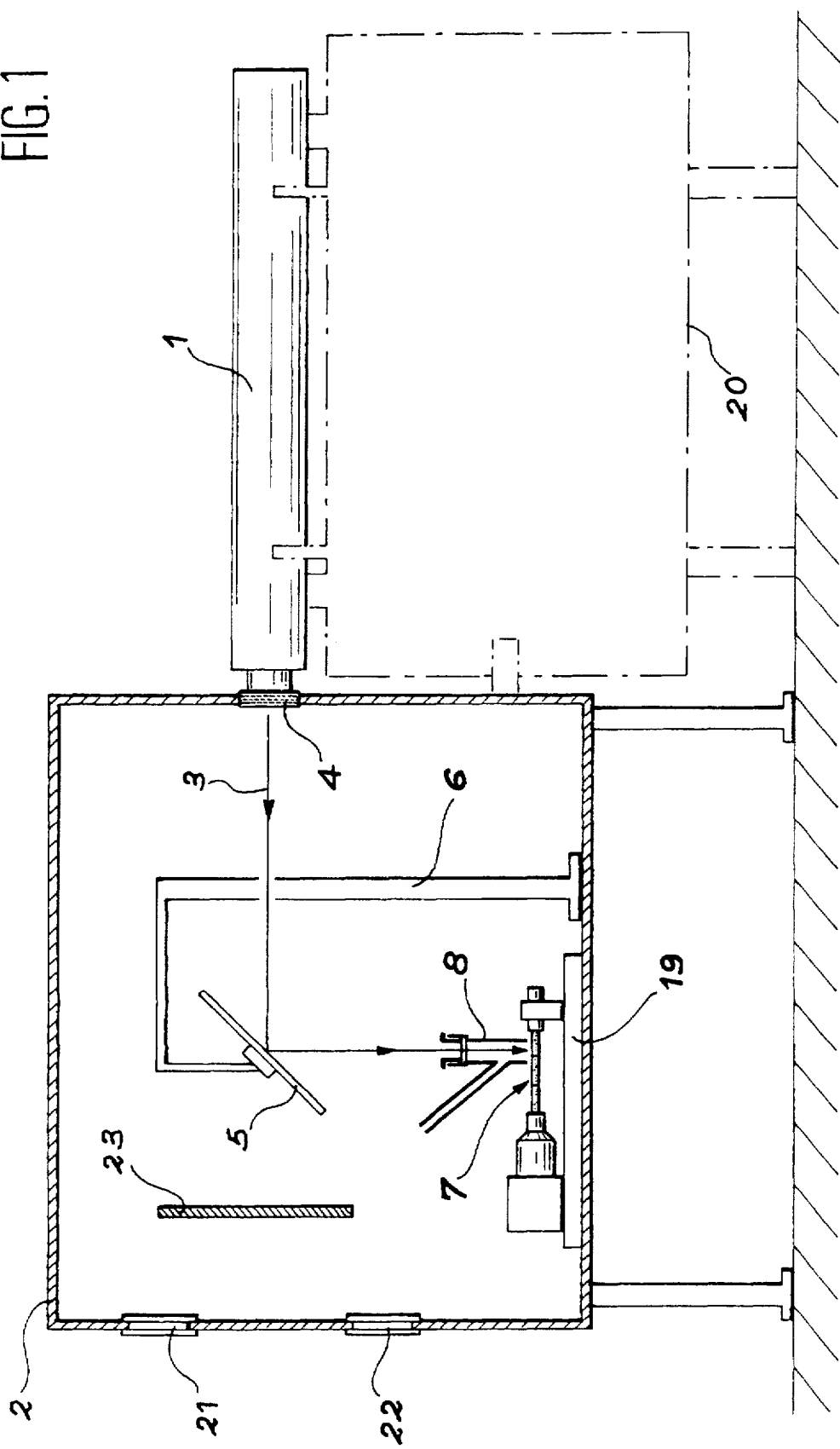

United States Patent [19]
Picco et al.

[11] Patent Number: 5,790,621
[45] Date of Patent: Aug. 4, 1998

[54] PROCESS AND APPARATUS FOR REMOVING DUST FROM NUCLEAR FUEL PELLETS BY MEANS OF A LASER BEAM

[75] Inventors: Bernard Picco, Avignon; Michel Marchand, Fontenay le Fleury, both of France

[73] Assignee: Compagnie Generale des Matrieres Nucleaire, Velizy-Villacoublay, France

[21] Appl. No.: 901,610

[22] Filed: Jul. 28, 1997

[30] Foreign Application Priority Data

Aug. 6, 1996 [FR] France .................. 96 09907

[51] Int. Cl.⁶ .................. G21C 19/00; G21C 21/00
[52] U.S. Cl. .................. 376/310; 376/326; 134/1
[58] Field of Search .................. 376/260, 261, 376/310, 316, 326; 15/1, 300.1; 356/318; 451/456; 134/1, 18, 25.1, 25.4

[56] References Cited

U.S. PATENT DOCUMENTS

| | | | |
|---|---|---|---|
| 4,004,378 | 1/1977 | Maxey | 451/456 |
| 4,220,414 | 9/1980 | Barringer | 356/318 |
| 5,540,001 | 7/1996 | Bouretz et al. | 15/348 |

FOREIGN PATENT DOCUMENTS

| | | |
|---|---|---|
| 380387 | 8/1990 | European Pat. Off. . |
| 2699317 | 6/1994 | France . |
| 2714464 | 6/1995 | France . |
| 1961315 | 12/1969 | Germany . |

OTHER PUBLICATIONS

Patent Abstracts of Japan, vol. 96, No. 5, May 21, 1996, & JP 08 019766 A (Hamamatsu Photonics KK), 23 Jan. 1996.

*Primary Examiner*—Daniel D. Wasil
*Attorney, Agent, or Firm*—Pearne, Gordon, McCoy & Granger LLP

[57] ABSTRACT

The invention relates to a process for removing dust from at least one nuclear fuel pellet (7) having undergone a grinding operation, which has left on the pellet surface dust of the material from which said pellet is formed. The process comprises subjecting said surface to the impact of a laser beam (3) having characteristics suitable for bringing about the disincrustation of the dust from said surface, and eliminating from said surface the products resulting from the dust disincrustation.

The invention also relates to an apparatus for performing this process.

Application to the dust removal from MOX pellets.

23 Claims, 4 Drawing Sheets

PROCESS AND APPARATUS FOR REMOVING DUST FROM NUCLEAR FUEL PELLETS BY MEANS OF A LASER BEAM

The present invention relates to a process for removing dust from nuclear fuel pellets by means of a laser beam. It also relates to an apparatus for performing this process.

The fuels used in the nuclear industry are formed from elements having a cylindrical geometry constituted by columns of pellets, each pellet column being placed in a can. The pellets can be made from uranium dioxide with a variable $^{235}$U content, which may or may not be combined with another oxide, such as plutonium dioxide ($PuO_2$). The pellets formed by a mixture of uranium dioxide ($UO_2$) and plutonium dioxide ($PuO_2$) are known as MOX (Mixed OXyde) pellets. These pellets are produced by compacting $UO_2$ powder or a mixture of $UO_2$ and $PuO_2$ powders, as a function of the pellet type, followed by sintering at high temperature. They can optionally undergo a grinding operation so as to respect the diameter requirements. This operation is indispensable in the case where the production process does not make it possible to directly respect without grinding the final diametric tolerances. This is e.g. the case for pellets used in a light water reactor.

The grinding operation takes place by machining the pellets between two grinding wheels, which gives rise to the formation of dust, some of which remains incrusted on the cylindrical surface of the pellets. The grinding dust consists of micron and submicron particles constituted by a material identical to that of the pellets. The dust exposure of the pellets varies as a function of the nature of the wheels used, the machining thickness, etc.

Said dust, which adheres to a greater or lesser extent to the ground pellet surface, can subsequently be deposited in the installations and form a particularly pronounced irradiation source in the case of fuels based on plutonium dioxide, where americium forms in a time-increasing quantity. The dust can also disturb the final automated sorting operations of the pellets and give rise to pellets being incorrectly rejected. They also lead to dust formation on the canning devices during the introduction of the pellets into the cans in order to form fuel rods.

The present invention aims at obviating these disadvantages. It permits a dust removal from nuclear fuel pellets, particularly MOX pellets, which have been ground and arrive in continuous flow form. The elimination of the grinding dust according to the present invention leads to the following advantages:
 elimination of the dispersion of radioactive material particles downstream of the grinder (residual contamination) and elimination of dust formation on installations and equipment placed in glove boxes,
 automatic appearance controls performed on the pellets and permitting their correct sorting are not falsified, which obviates certain pellets being incorrectly rejected,
 elimination of dust formation on the canning devices so that, during the canning of the pellets for forming rods, rod contamination is avoided.

An apparatus for removing dust from nuclear fuel pellets by means of a laminar gas flow is known and is described in FR-A-2 699 317. It comprises a dust removal tube within which circulate the pellets to undergo dust removal. The tube is provided at its inlet end with a gas injection orifice, a pellet introduction opening and means for creating a laminar, dust removing gas flow at a speed of at least 25 m/s around the pellets circulating in the tube, said gas flow being parallel and in the same direction as the pellet displacement direction and the dust removal tube is also provided at its outlet end with a dust and gas suction orifice and a dust-removed pellet recovery opening.

For removing dust from nuclear fuel pellets and in particular dust incrusted on the surface of the pellets following the grinding operation, the present invention proposes the use of a laser beam having an appropriate power.

It is known to use the impact of a laser beam for cleaning the surface of an object. It is therefore possible to clean surfaces polluted by deposits of compounds coming from the environment in order to restore their initial state, e.g. for restoring works of art. Thus, EP-A-380 387 discloses a process for cleaning the surface of materials (particularly stone, glass, steel, ceramic, wood, paper and cardboard) using a laser beam focussed on the surface to be cleaned. The "peak power" of the laser used for this purpose is set to a value between a few hundred kW and a few dozen MW. The diameter of the laser beam on the surface to be cleaned is chosen so as to obtain on said surface a "peak power" density between a few tenths and a few dozen $MW/cm^2$. The installation described has a laser and a optical system for splitting the laser beam into several other laser beams. The field of application of the procedure disclosed in this document is particularly that of restoring works of art (historic monuments, wooden furniture, glass, pottery) and also that of cleaning tubes during their manufacture or their subsequent descaling.

It is also known to use a laser beam for controlling the contamination or pollution state of the surface of a solid. Thus, FR-A-2 714 464 discloses a laser contamination control process more particularly using a device for the suction of particles ejected by the laser beam with a view to the analysis of said particles. This device comprises an enclosure having an opening for covering an area of the surface to be controlled, the enclosure being provided with a plate or foil transparent to the laser beam for extracting the particles to be sampled by its impact on said area. The enclosure also comprises an inlet and an outlet permitting the circulation of a gas for the transfer of the particles and the enclosure can be provided with a supplementary inlet placed as close as possible to the transparent plate so that the gas scavenges said plate.

The impact of a laser beam can also be used for sampling for analysis purposes a material sample. The laser beam brings about the vaporization of the sample and the vaporized material is collected, e.g. by condensation on a support (cf. DE-A-1 961 315) or using an inert carrier gas (cf. U.S. Pat. No. 4,220,414).

In the case of the present invention, the impact of a laser beam is not used for removing a polluting or contaminating layer of a different material deposited on the surface of an object, or for taking a material sample for analysis purposes. The impact of a laser beam having an appropriate power is used for bringing about the photon disincrustation of machining dust present on the surface of nuclear fuel pellets, the dust being of the same nature as the material of the pellets and previously belonged to said material.

The invention more particularly aims at eliminating from the surface of the pellets any constituent particle which may be disengaged from the surface of the pellets during their subsequent handling operations as a result of embrittlement due to grinding.

Thus, the invention relates to a process for the dust removal from at least one nuclear fuel pellet which has undergone a grinding operation leaving behind on a surface of the pellet dust of the material constituting said pellet, characterized in that it consists of subjecting said surface to the impact of a laser beam having characteristics suitable for bringing about the disincrustation of the dust from said surface and the elimination from said surface of the products resulting from the disincrustation of the dust.

Advantageously, the impact of the laser beam on said surface generates a laser shock effect (i.e. the specific power supplied by the laser exceeds 100 MW/cm$^2$).

If the laser beam is fixed, the pellet can be moved in order to present its entire surface to undergo dust removal to the impact of the laser beam.

In this case, if the pellet is a cylinder of revolution and if the surface to undergo dust removal is the cylindrical surface of the pellet, excluding its bases, the movement of the pellet relative to the laser beam can be a translatory movement in accordance with the major axis of the pellet associated with a rotary movement of the pellet about its major axis.

The movement of the pellet or a group, e.g. three pellets can also simply be a rotary movement of the pellet or group of pellets about the major axis of the pellet or group of pellets, without any translatory movement with respect to the laser beam, if the laser beam spot has an adequate size to cover the pellet or group of pellets exposed to its impact.

The invention also relates to an apparatus for removing the dust from at least one nuclear fuel pellet which has undergone a grinding operation leaving behind on a surface of said pellet dust of the material from which said pellet is made, characterized in that it comprises means for exposing said surface to the impact of a laser beam having characteristics suitable for bringing about the disincrustation of dust from said surface and means for eliminating from said surface products resulting from the disincrustation of the dust.

Preferably, with the laser beam fixed, the apparatus comprises a mechanism for moving the pellet in order to present the entire surface to undergo dust removal to the impact of the laser beam.

Such a mechanism can comprise means for rotating the pellet on itself and optionally means for the translation of the pellet relative to the laser beam.

The invention is described in greater detail hereinafter relative to non-limitative embodiments and with reference to the attached drawings, wherein show:

FIG. 1 An overall view of a nuclear fuel pellet dust removal installation according to the present invention.

Figure 2:
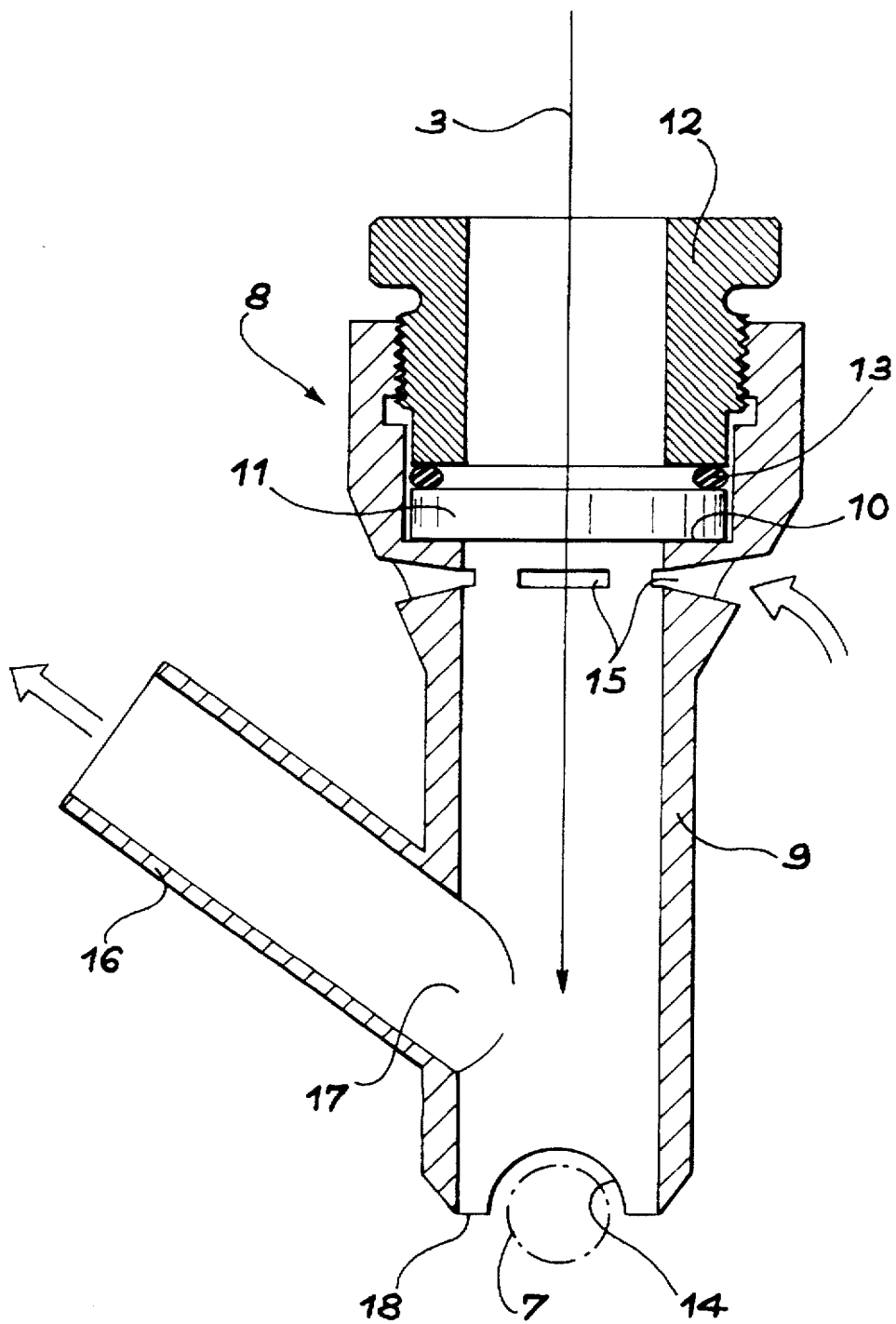

FIG. 2 A detail of the nuclear fuel pellet dust removal installation of FIG. 1.

Figure 3:
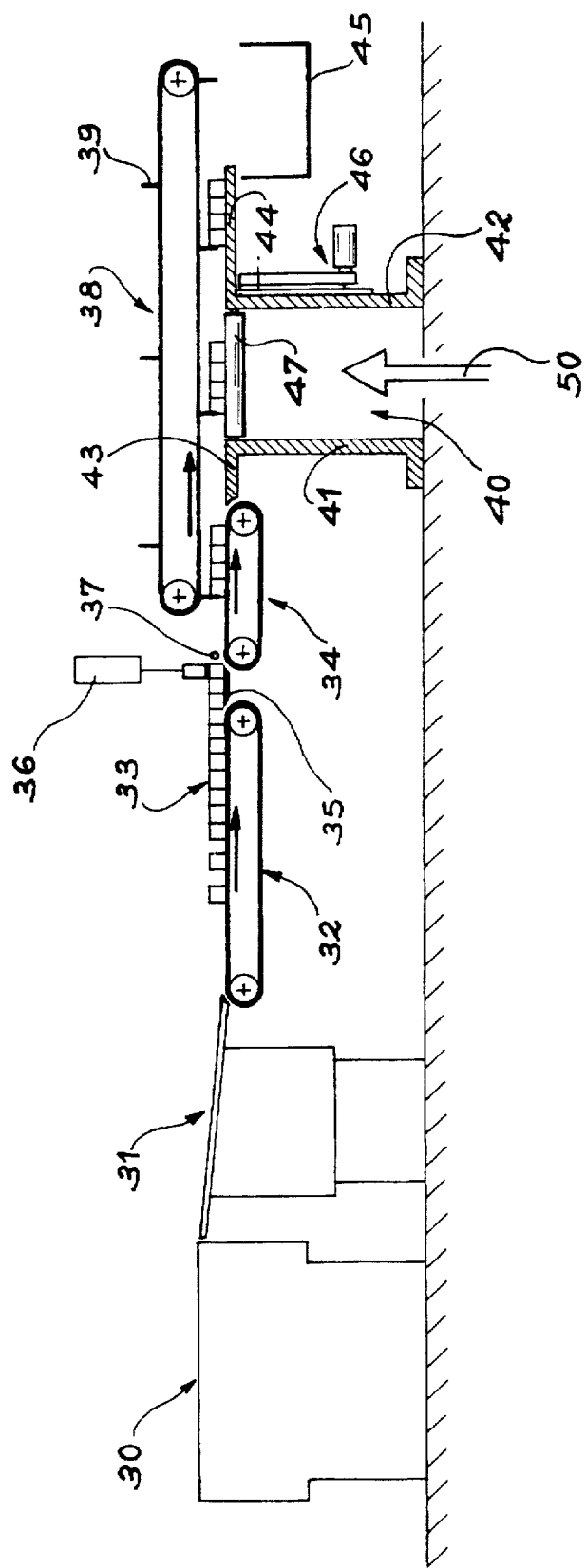

FIG. 3 An overall view of an industrial nuclear fuel pellet dust removal installation according to the present invention.

Figure 4:
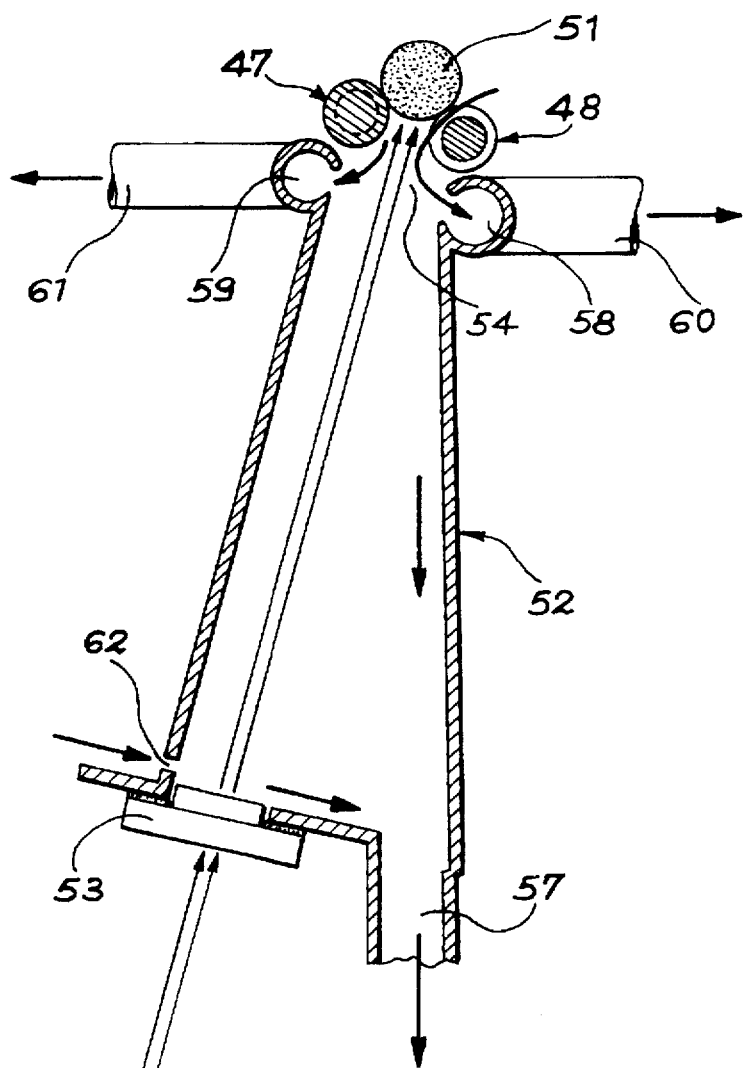

FIG. 4 A detail of the installation of FIG. 3.

Figure 5:
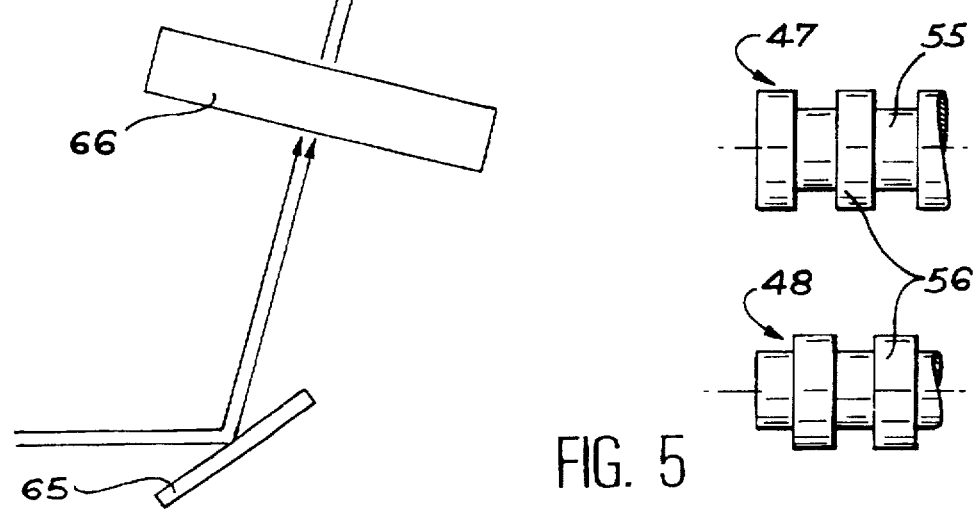

FIG. 5 A detail of the apparatus shown in FIG. 4.

The dust removal installation shown in FIG. 1 comprises a laser source 1 docked against a glove box 2, which is necessary when it is a question of treating MOX pellets. The laser beam 3 penetrates the glove box 2 after traversing a transparent glass window 4 located in the glove box wall. By means of one or more deviating mirrors, such as the mirror 5 carried by the bracket 6, it is then directed towards the zone where the pellets 7 are located. Before reaching a pellet, the laser beam traverses a suction system mainly constituted by a member 8 for recovering the products resulting from the dust disincrustation. The member 8 is shown in greater detail in FIG. 2.

FIG. 2 also shows a laser beam 3 and a pellet 7 viewed along one of its bases. The member 8 comprises a generally tubular body 9 centred on the laser beam 3. The upper part of the body 9 is machined to form a reception seat 10 for a plate 11, which is transparent to the laser beam 3. The upper end of the body 9 is tapped for screwing a tubular plug 12 for maintaining the plate 11 in position on its seat after interposing an O-ring.

The lower part of the body 9 is transversely perforated by a semi-cylindrical channel 14 with a diameter slightly larger than the diameter of a pellet 7 and which issues into the lower opening 18 of the body 9. Thus, said opening is shaped so as to overlap the pellet 7. In its portion between the seat 10 of the transparent plate 11 and the channel 14, the body 9 has openings 15 located very close to the plate 11.

A duct 16 is connected to the lower part of the body 9 in accordance with an axis inclined with respect to the laser beam 3, said axis being directed towards the lower opening 18. The duct 16 rejoins the body 9 at an orifice 17 called the suction orifice.

FIG. 1 shows that in this embodiment of the invention there are three pellets 7 placed on a moving mechanism 19, which gives the pellets 7 a translatory movement with respect to the laser beam 3 combined with a rotary movement of the pellets on themselves. As a result of this double movement the entire cylindrical surface of the pellets is exposed to laser beam impact. The bases of the pellets, which have not been ground, are not exposed to the laser beam impact. The mechanism 19 can comprise a rod and a locking means acting on the ends of the column of pellets.

The installation also comprises a supply group 20 for the laser, observation windows 21 and 22 placed on one wall of the glove box 2 and a laser beam protective screen 23.

Tests were carried out with the installation shown in FIG. 1 using a pulse YAG laser working in the infrared (for a wavelength of 1064 nm). The flash rate was a function of the speed of advance of the pellets under the laser beam. Satisfactory results were obtained for flash rates of 5 and 10 Hz. A frequency of 20 Hz or higher can be envisaged for an industrial installation. The pulse duration was approximately 7 ns. The energy per pulse was 1850 mJ, with a use power of 150 MW/cm$^2$±10 MW/cm$^2$ supplied in this form to the pellet surface. The laser beam spot can be circular (diameter 7, 9 or 11 mm), elliptical (dimensions 19×10 mm) or rectangular (e.g. 50×2 mm). The rectangular spot can be obtained by shaping the laser beam using anamorphosis cylindrical lenses and a convergent lens. This rectangular spot is preferred for removing dust from pellets, because it permits an optimum coverage during treatment.

In an industrial installation, there can be a continuous pellet supply beneath the laser beam.

For a better dust removal efficiency, it is preferable to suck the disincrusted dust. This is the function of the suction member 8 placed as close as possible to the area of the pellet undergoing treatment. The openings 15 of the member 8 are connected to a neutral gas or air supply pipe (e.g. argon), which is not shown. The duct 16 is connected to a not shown suction circuit.

The suction rate is preferably between 20 and 60 m/s, e.g. 40 m/s, in the case of tests carried out. The positioning of the openings 15 in the vicinity of the transparent plate 11 makes it possible, by means of the thus formed gas curtain, to avoid disincrusted dust from being deposited on the plate 11. The effect of the curtain is increased by the fact that the flow in the upper part of the body 9 is downwards. This prevents any dust rising, being projected at high speed by the photon disincrustation process. If the suction speed is too low, dust retention occurs in the duct 16. If it is too high, there is excessive turbulence, which is prejudicial to industrial application.

A first series of tests was carried out under the following conditions:
pellet rotation: 50 r.p.m.
pellet translation: 200 mm/minute.
laser power: 70 to 160 MW/cm².
1 or 2 laser passes.
laser frequency: 5 or 10 Hz.
suction flow rate: 50 m³/h.

It was found that for a frequency of 5 or 10 Hz, satisfactory results are obtained for laser powers higher than 100 MW/cm² in 1 or 2 passes.

A second test series was performed under the following conditions:
blown pellet bases.
pellet rotation: 97 r.p.m.
pellet translation: 1250 mm/minute.
laser power: 40 to 160 MW/cm²
1 or 2 laser passes.
laser frequency: 10 Hz.
suction flow rate: 25 m³/h.

It was found that very satisfactory results are obtained for laser powers equal to or higher than 130 MW/cm², particularly when the pellet bases are subject to a blowing rate of 10 1/min.

Smear tests were also performed. Prior to laser treatment according to the present invention, the smears indicated the presence of dust, whereas after treatment no dust was detected thereon.

Roughness analyses performed on samples obtained from the above tests demonstrated that said roughness was not significantly modified by the laser treatment.

The process according to the invention offers the advantages of no pellet deterioration, a high dust removal rate and an excellent dust removal efficiency.

Examination with the scanning electron microscope revealed that following a treatment according to the invention, no dust was left on the treated surfaces and that the pellets were not damaged.

The industrial dust removal installation shown in FIG. 3 makes it possible to automatically treat pellets leaving a grinder. The installation is based on a kinematic chain formed from motorized belts and vibrating feeders or bowls and makes it possible to treat n pellets at once. In the case described in FIG. 3, n is equal to 4.

The pellets to undergo dust removal contained a vibrating bowl 30 are brought by means of a vibrating rail 31 to a first motorized belt 32. For example, the pellet advance speed is 15 mm/s on the vibrating rail 31 and 30 mm/s on the motorized belt 32. As a result of the vibrating rail, the pellets are placed on the motorized belt 32 with their major axis parallel to the advance direction, so that a column of pellets 33 can be formed.

A second motorized belt 34 is placed in the extension of the first motorized belt 32 to receive the aligned pellets on said first motorized belt. The junction between the belts 32 and 34 is provided by means of a guide block or ski 35. The second motorized belt 34 can have an advance speed of 60 mm/s.

The pellets are successively supplied in columns of four to the second belt 34 by means of a pinching or gripping device 36 making it possible to retain the pellets on the guide block 35 or release them. The formation of the columns takes place by counting pellets using a fibre optics device, the end of the optical fibre being visible at 37.

A third motorized belt 38, partly overlapping the second motorized belt 34 and whose advance speed is also 60 mm/s, is equipped with tongues 39 arranged regularly over the belt surface in order to advance each column of pellets formed to the dust removal area 40 and beyond the latter.

The dust removal area 40 is located between two vertical panels 41 and 42. The panel 41 supports a plane 43 for supplying pellet columns from the second motorized belt 34 to the dust removal area 40. The panel 42 supports a plane 44 for evacuating columns from the dust removal area 40 and up to a reception tank for the pellets 45. The panel 42 also supports a group 46 comprising an electric motor and a system of transmitting the rotary movement generated by the motor to two parallel rollers 47 and 48 (only roller 47 being visible in FIG. 3) arranged in freely rotating manner between the panels 41 and 42. At 50 can be seen the laser beam directed at the supported pellet column and rotated by the rollers and pushed by a tongue 39 of the second motorized belt 38.

FIG. 4 is a cross-sectional view of rollers 47 and 48 rotating a pellet 51, forming part of a pellet column, whilst permitting the treatment of said pellet by the laser beam 50. The pellet rotation speed can be one revolution per second. It is also possible to see the member 52 for recovering products resulting from the disincrustation of dust. For reasons of clarity, member 52 is not shown in FIG. 3.

Member 52 has a portion 53 transparent to the laser beam 50 and an opening 54 facing the pellet 51 and permitting the passage of the laser beam 50 and the suction of the products obtained. As can be seen in FIG. 4, the laser beam is angularly displaced with respect to the vertical in order to prevent dust formation on the transparent plate 53 as a result of large particles or splinters coming from the pellets being treated.

The opening 54 is elongated in the direction of the rollers 47 and 48 in order to make it possible to treat the pellet column over its entire length by means of a laser beam, whose spot is 50 mm ×2 mm.

The spacing between the rollers 47, 48 and the adjacent edge of the member 52 is as small as possible. As shown in FIG. 5, where the rollers 47 and 48 are shown longitudinally, the latter are grooved so as to permit the introduction of a carrier gas. On fitting the rollers 47, 48, it is preferable to position them in the manner shown in FIG. 5, i.e. in such a way that with a groove 55 of roller 47 corresponds an ungrooved portion 56 of roller 48.

The member 52 has three suction nozzles, a nozzle 57 provided in the lowest part of the member 52 and two lateral nozzles 58, 59 close to the opening 54. The nozzles 58 and 59 are respectively connected to ducts 60 and 61, which can have diaphragms in order to balance the suction flows. The speed of the gas carried in the suction ducts can be 20 to 30 m/s. The nozzles 58 and 59 are advantageously connected to the ducts by fishtail bits so as to maintain a uniform suction over the entire length.

A slot 62 facing the inner face of the transparent portion 53, makes it possible to inject a gas with a regulatable flow rate so as to optimize the dust removal with respect to the transparent portion 53. This slot can be completed by other slots located on the same oblique face of the member 52, between slot 62 and nozzle 59, so as on the one hand to create complimentary air curtains and on the other favour the deflection of dust towards the nozzle 57. Another arrangement consists of favouring the suction by the nozzle 58 to the detriment of the nozzle 59, so as to favour the deflection of the dust plume towards the nozzle 57.

FIG. 4 also shows a pivoting mirror 65 and a laser beam shaping device 66. The pivoting mirror 65 permits a periodic cleaning of the rotary rollers 47, 48 by the laser beam 50.

We claim:

1. Process for removing dust from at least one nuclear fuel pellet which has undergone a grinding operation leaving behind on a surface of the pellet dust of the material constituting said pellet, consisting of subjecting said surface to the impact of a laser beam having characteristics suitable for bringing about the disincrustation of dust from said surface and eliminating from said surface the products resulting from the disincrustation of the dust.

2. Process according to claim 1, the impact of the laser beam on said surface generating a laser shock effect.

3. Process according to claim 1, wherein with the laser beam fixed the pellet is moved in order to present the entire surface to undergo dust removal to the laser beam inpact.

4. Process according to claim 3, wherein several pellets are arranged in a group, the movement consisting of a rotation of the group of pellets.

5. Process according to claim 3, wherein the pellet is a cylinder of revolution and the surface to undergo dust removal is the cylindrical surface of the pellet, excluding its bases, the movement of the pellet with respect to the laser beam is a translatory movement along the major axis of the pellet associated with a rotary movement of the pellet about its major axis.

6. Process according to claim 5, several pellets being combined base to base in order to form a column subject to the laser beam impact.

7. Process according to claim 1, wherein the laser beam has a rectangular cross-section.

8. Process according to claim 1, wherein the elimination of the dust resulting from dust disincrustation takes place by suction.

9. Process according to claim 8, wherein the surface exposed to the impact of the laser beam is scavenged by a gas flow in a direction facilitating the suction of the products resulting from dust disincrustation.

10. Process according to claim 1, characterized in that it takes place within a closed enclosure.

11. Apparatus for removing dust from at least one nuclear fuel pellet which has undergone a grinding operation leaving behind on a surface of the pellet dust of the material from which said pellet is made, comprising means for subjecting said surface to the impact of a laser beam having characteristics appropriate for bringing about the disincrustation of dust from said surface and means for eliminating from said surface the products resulting from dust disincrustation.

12. Apparatus according to claim 11, wherein with the laser beam fixed, the apparatus comprises a mechanism for moving the pellet in order to present the entire surface to undergo dust removal to the impact of the laser beam.

13. Apparatus according to claim 12, wherein the pellet moving mechanism comprises two rotary rollers supporting the pellet and transmitting a rotary movement to it.

14. Apparatus according to claim 12, wherein said mechanism comprises means for rotating the pellet on itself and means for translating the pellet with respect to the laser beam.

15. Apparatus according to claim 12, also comprising means for combining several pellets and for subjecting said pellets to the impact of the laser beam.

16. Apparatus according to claim 12 comprising means making it possible to give a rectangular cross-section to said laser beam.

17. Apparatus according to claim 11, wherein the means for eliminating the products resulting from disincrustation of dust comprise a suction system.

18. Apparatus according to claim 17, wherein the suction system comprises a member for recovering products resulting from the disincrustation of dust, said member having a portion transparent to said laser beam and arranged so as to transmit, via the interior of the member, the laser beam to the pellet, an opening to be positioned facing the pellet and permitting the passage of the laser beam and the suction of said products, at least one orifice for introducing a carrier gas in the direction of the pellet and at least one orifice for the suction of the carrier gas carrying said products.

19. Apparatus according to claim 18, wherein said carrier gas introduction orifice is positioned between said transparent portion and said opening, in the vicinity of said transparent portion.

20. Apparatus according to claim 19, said opening being shaped so as to overlap the pellet.

21. Apparatus according to claim 18, wherein the pellet moving mechanism comprises two rotary rollers supporting the pellet and imparting to it a rotary movement, said member being positioned beneath the assembly constituted by the rotary rollers and the pellet, the opening of the member serving as a carrier gas introduction orifice, at least one carrier gas suction orifice being located in the vicinity of said opening.

22. Apparatus according to claim 21, wherein the portion transparent to the laser beam is positioned so as to angularly displace the laser beam with respect to the vertical.

23. Apparatus according to claim 21, comprising a mirror for directing the laser beam at the pellet, the mirror being able to pivot so as to direct the laser beam onto the rotary rollers for cleaning them.

* * * * *

UNITED STATES PATENT AND TRADEMARK OFFICE
CERTIFICATE OF CORRECTION

PATENT NO. : 5,790,621
DATED : August 4, 1998
INVENTOR(S) : Picco et al.

It is certified that error appears in the above-identified patent and that said Letters Patent is hereby corrected as shown below:

On the title page: Section [73] Assignee:, delete "Matrieres" and insert --Matieres-- and delete "Nucleaire" and insert --Nucleaires--.

Signed and Sealed this

Second Day of February, 1999

Attest:

Attesting Officer

*Acting Commissioner of Patents and Trademarks*